United States Patent
Birkeland (10) Patent No.: US 12,434,311 B2
(45) Date of Patent: Oct. 7, 2025

(54) METHOD FOR CUTTING A TUBULAR STRUCTURE AT A DRILL FLOOR AND A CUTTING TOOL FOR CARRYING OUT SUCH METHOD

(71) Applicant: Control Cutter AS, Tananger (NO)

(72) Inventor: Petter Birkeland, Tananger (NO)

(73) Assignee: CONTROL CUTTER AS, Tananger (NO)

( * ) Notice: Subject to any disclaimer, the term of this patent is extended or adjusted under 35 U.S.C. 154(b) by 326 days.

(21) Appl. No.: 16/644,420

(22) PCT Filed: Nov. 22, 2018

(86) PCT No.: PCT/NO2018/050291
§ 371 (c)(1),
(2) Date: Mar. 4, 2020

(87) PCT Pub. No.: WO2019/108066
PCT Pub. Date: Jun. 6, 2019

(65) Prior Publication Data
US 2020/0290136 A1    Sep. 17, 2020

(30) Foreign Application Priority Data
Nov. 29, 2017   (NO) .................................. 20171910

(51) Int. Cl.
*B23D 21/00*   (2006.01)
*B23D 15/04*   (2006.01)
(Continued)

(52) U.S. Cl.
CPC ........... *B23D 21/006* (2013.01); *B23D 15/04* (2013.01); *B23D 29/002* (2013.01); *B26D 1/08* (2013.01); *E21B 29/00* (2013.01)

(58) Field of Classification Search
CPC .. B23D 15/04; B23D 29/002; B23D 57/0084; B26D 3/16; B26D 21/006; B26D 1/08;
(Continued)

(56) References Cited

U.S. PATENT DOCUMENTS 2,090,206 A * 8/1937 King ..................... E21B 33/062
                                                     277/325
2,620,030 A * 12/1952 Anderson ............... B21C 37/29
                                                      83/580

(Continued)

FOREIGN PATENT DOCUMENTS

AU    2018375044    7/2021
BR    112020004132  9/2020
(Continued)

OTHER PUBLICATIONS

Daniell Collins, What are the main types of linear actuators, Feb. 2017, Linear Motion Tips, https://www.linearmotiontips.com/main-types-linear-actuators/ (Year: 2017).*
(Continued)

*Primary Examiner* — Adam J Eiseman
*Assistant Examiner* — Fernando A Ayala
(74) *Attorney, Agent, or Firm* — Andrus Intellectual Property Law, LLP (57) ABSTRACT

A method is for cutting a tubular structure, such as a drill string, at a drill floor of a drilling rig. The method includes the following steps: i) providing a cutting tool at the drill floor comprising a non-rotatable cutting element configured for carrying out a translational cutting movement through the tubular structure; ii) positioning the cutting tool in cutting position exterior to the tubular structure; iii) fixing the position of the cutting tool with respect to the tubular structure, and iv) activating the cutting tool for cutting the tubular structure by using a translation movement of the at
(Continued)

least one cutting element through the tubular structure. A cutting tool is for use in such method.

20 Claims, 7 Drawing Sheets

(51) Int. Cl.
*B23D 29/00* (2006.01)
*B26D 1/08* (2006.01)
*E21B 29/00* (2006.01)

(58) Field of Classification Search
CPC . B26D 2007/013; E21B 29/00; B25B 27/026; B25B 27/146; B25F 5/005; B26B 19/08; B26B 19/3846; B26B 19/06
See application file for complete search history.

(56) References Cited

U.S. PATENT DOCUMENTS

| | | | | | |
|---|---|---|---|---|---|
| 2,808,822 | A * | 10/1957 | Celapino | ................ | B28D 1/222 125/36 |
| 2,819,710 | A * | 1/1958 | Mangis | ................ | B28D 1/222 125/23.01 |
| 3,190,330 | A * | 6/1965 | Hawkins | ................ | A47J 17/00 30/294 |
| 3,474,533 | A * | 10/1969 | Peck | ................ | H02G 1/005 30/348 |
| 3,561,526 | A * | 2/1971 | Williams, Jr. | ........ | E21B 33/063 83/639.1 |
| 3,886,927 | A * | 6/1975 | Chattin | ................ | B28D 1/223 125/23.01 |
| 4,057,087 | A * | 11/1977 | Oldenburg | ........... | A01G 23/089 144/34.5 |
| 4,641,694 | A | 2/1987 | Rohde | | |
| 4,767,305 | A * | 8/1988 | Tashiro | ................ | A21C 11/103 99/450.6 |
| 5,139,006 | A * | 8/1992 | Trudeau | ................ | E02D 9/005 125/12 |
| 6,174,154 | B1 * | 1/2001 | Tashiro | ................ | A21C 11/103 425/142 |
| 6,183,171 | B1 * | 2/2001 | Ou-Young | ........... | A21C 11/103 407/113 |
| 6,352,012 | B1 * | 3/2002 | Borzym | ................ | B23D 23/00 83/186 |
| 6,554,073 | B2 | 4/2003 | McGarian | | |
| 6,662,621 | B1 * | 12/2003 | Amherd | ................ | B25B 27/10 72/31.11 |
| 6,792,789 | B1 * | 9/2004 | Faucher | ............ | B21D 39/048 72/416 |
| 7,121,310 | B2 | 10/2006 | Clark et al. | | |
| 7,351,010 | B1 * | 4/2008 | Kelly | ................ | F16L 1/166 405/158 |
| 7,354,026 | B2 * | 4/2008 | Urrutia | ................ | E21B 33/063 251/1.3 |
| 8,056,633 | B2 | 11/2011 | Barra et al. | | |
| 8,632,047 | B2 * | 1/2014 | Hall | ................ | E21B 33/063 251/1.3 |
| 8,656,939 | B2 | 2/2014 | Sharp et al. | | |
| 10,119,354 | B2 * | 11/2018 | Wilie | ................ | E21B 33/063 |
| 10,279,402 | B2 * | 5/2019 | Frenken | ................ | B23D 29/002 |
| 10,364,633 | B2 | 7/2019 | Birkeland | | |
| 2002/0174753 | A1 * | 11/2002 | Cox | ................ | B26D 7/265 83/13 |
| 2004/0226424 | A1 * | 11/2004 | O'Banion | ................ | F16P 3/144 83/397 |
| 2005/0194000 | A1 * | 9/2005 | Todack | ................ | B28D 1/222 125/23.01 |
| 2005/0274249 | A1 * | 12/2005 | Trudeau | ................ | B26D 1/08 83/636 |
| 2010/0005849 | A1 * | 1/2010 | College | ................ | B25B 27/10 72/453.01 |
| 2010/0043609 | A1 | 2/2010 | Franze | | |
| 2011/0088911 | A1 | 4/2011 | Boyce et al. | | |
| 2012/0291606 | A1 * | 11/2012 | Khoury | ................ | E02D 9/005 83/639.1 |
| 2013/0152759 | A1 | 6/2013 | Fraze | | |
| 2013/0153204 | A1 * | 6/2013 | Carbaugh | ............ | E21B 33/063 166/85.4 |
| 2014/0048245 | A1 * | 2/2014 | Yendell | ................ | E21B 33/063 166/85.4 |
| 2014/0147217 | A1 | 5/2014 | Ammerlaan | | |
| 2016/0010415 | A1 * | 1/2016 | Myhre | ................ | E21B 33/13 166/290 |
| 2017/0130799 | A1 * | 5/2017 | Spyche, Jr. | ................ | F41A 3/90 |
| 2017/0234099 | A1 * | 8/2017 | Wright | ................ | E21B 33/00 166/386 |
| 2017/0254159 | A1 * | 9/2017 | Kubichek | ........... | F15B 15/1428 |
| 2017/0266791 | A1 * | 9/2017 | Barezzani | ............ | B23D 29/002 |
| 2017/0282263 | A1 * | 10/2017 | Khoury | ................ | B23D 31/008 |
| 2018/0006437 | A1 * | 1/2018 | Frenken | ................ | H02G 1/005 |
| 2018/0161890 | A1 * | 6/2018 | Barezzani | ............ | B25B 27/14 |
| 2020/0164538 | A1 * | 5/2020 | Hetland | ............ | B23D 29/002 |
| 2020/0180049 | A1 * | 6/2020 | Frenken | ................ | B23D 29/00 |
| 2021/0213644 | A1 * | 7/2021 | Trudeau | ................ | E02D 9/04 |

FOREIGN PATENT DOCUMENTS

| | | | | |
|---|---|---|---|---|
| CA | 3074648 | | 6/2019 | |
| EP | 3717167 | | 8/2021 | |
| GB | 1312851 | | 11/1973 | |
| GB | 2310842 | | 11/1999 | |
| GB | 2313859 | | 7/2000 | |
| JP | S6071110 | | 4/1985 | |
| NO | 20171910 | | 5/2019 | |
| SG | 11202001771 | | 3/2020 | |
| SU | 1263808 | | 10/1986 | |
| WO | 2000078491 | | 12/2000 | |
| WO | 2010043850 | | 4/2010 | |
| WO | WO-2010043850 | A1 * | 4/2010 | ............ B23D 15/14 |
| WO | 2014093530 | | 6/2014 | |
| WO | 2017099607 | | 6/2017 | |
| WO | 2019108066 | | 6/2019 | |

OTHER PUBLICATIONS

Norwegian Search Report for No. 20171910, dated Jun. 21, 2018.
International Search Report and the Written Opinion for PCT/No. 2018/050291, mailed Mar. 5, 2019.
Reply to the Written opinion for PCT/No. 2018/050291, dated May 14, 2019.
International Preliminary Report on Patentability for PCT/NO2018/050291, dated Oct. 29, 2019.
European Search Report, EP Patent Application No. 16873432.5, dated May 22, 2019.
1 European Examination Report from corresponding EP Patent Application No. 18882606.9, dated Jul. 24, 2023.

* cited by examiner

METHOD FOR CUTTING A TUBULAR STRUCTURE AT A DRILL FLOOR AND A CUTTING TOOL FOR CARRYING OUT SUCH METHOD

CROSS-REFERENCE TO RELATED APPLICATIONS

This application is the U.S. national stage application of International Application PCT/NO2018/050291, filed Nov. 22, 2018, which international application was published on Jun. 6, 2019, as International Publication WO 2019/108066 in the English language. The International Application claims priority of Norwegian patent application No. 20171910, filed Nov. 29, 2017. The international application and Norwegian application are both incorporated herein by reference, in entirety.

FIELD OF THE INVENTION

The invention relates to a method for cutting a tubular structure, such as a drill string, at a drill floor of a drilling rig. The invention further relates to a cutting tool for use in such method.

BACKGROUND OF THE INVENTION

In drilling operations, such as operations on an oilrig, there is sometimes a need to cut tubular structures, such as casings, drill strings, production tubings and risers. Different techniques for cutting tubular structures have been developed. One of the most common ways to cut tubular structures at the drill floor is abrasive cutting from within the tubular structure, diamond wire cutting or a mechanical saw cutting. Typically, the tubular structure is cut in small sections, which are then taken away from the drill floor. Typical cutting time for a 30-inch casing is in the order of a few hours. The problem with above cutting techniques is that it takes too much time. Thus, there is a need for faster cutting techniques.

SUMMARY OF THE INVENTION

The invention has for its object to remedy or to reduce at least one of the drawbacks of the prior art, or at least provide a useful alternative to prior art.

The object is achieved through features, which are specified in the description below and in the claims that follow.

The invention is defined by the independent patent claims. The dependent claims define advantageous embodiments of the invention.

In a first aspect the invention relates to a method for cutting a tubular structure, such as a drill string, at a drill floor of a drilling rig, the method comprising the following steps:
- providing a cutting tool at the drill floor comprising a non-rotatable cutting element configured for carrying out a translational cutting movement through the tubular structure;
- positioning the cutting tool in cutting position exterior to the tubular structure;
- fixing the position of the cutting tool with respect to the tubular structure, and
- activating the cutting tool for cutting the tubular structure by using a translation movement of the at least one cutting element through the tubular structure.

The effects of the mobile cutting tool in accordance with the invention are as follows.

By providing a cutting tool at the drill floor, which uses translational cutting instead of rotational abrasive cutting the cutting of the tubular structure at the drill floor may carried out much faster than the conventional cutting techniques allow. The translational cutting technology has been developed before for subsea applications as known from WO2017/099607A1. The inventor realized that such cutting may also be carried out at the drill floor, leading to enormous time gain with cutting times down to 5 minutes as experiments have shown. This in contrast with the earlier described abrasive cutting techniques, which can take up to 2 hours easily.

In order to facilitate understanding of the invention one or more expressions are further defined hereinafter.

Wherever the wording "drill floor" is used, this is interpreted to be the heart of any drilling rig (such as an oil rig, but the drill floor may also be on a boat or other floating vessel), i.e. the area where the drill string begins its trip into the earth. It is traditionally where joints of pipe are assembled, as well as the BHA (bottom hole assembly), drilling bit, and various other tools. This is the primary work location for roughnecks and the driller. The drill floor is located directly under the derrick or drill tower. The floor is typically a relatively small work area in which the rig crew conducts operations, usually adding or removing drill pipe to or from the drill string. The rig floor is the most dangerous location on the rig because heavy iron is moved around there. Drill string connections are made or broken on the drill floor, and the driller's console for controlling the major components of the rig are located there.

In an embodiment of the method in accordance with the invention the cutting tool is moved to and from the tubular structure at the drill floor by means of a crane or manipulator. The cutting tool in this embodiment of the method is conveniently manipulated by means of a crane or manipulator, wherein the cutting tool is hung or mounted. It is brought to the tubular structure at the drill floor when it is needed and taken away when no longer needed.

In an embodiment of the method in accordance with the invention the cutting tool is moved to and from the tubular structure at the drill floor by means of a rail system. The cutting tool in this embodiment of the method is conveniently manipulated by means of a rail system, i.e. the cutting tool is rolled towards the tubular structure at the drill floor when it is needed and rolled away when no longer needed.

In an embodiment of the method in accordance with the invention the tubular structure to be cut is one of the group consisting of: a casing, a drill string, a production tubing, and a riser. These tubular structures are the most conventional types that may need to be cut at the drill floor. In addition to cutting these types of tubular structures, the invention even facilitates rapid cutting of a casing with a tubing inside with cement in between. Alternatively, the invention facilitates cutting a riser with multiple internal casings and a tubing with cement in between in the different tubular structures.

In an embodiment of the method in accordance with the invention, in the step of providing the cutting tool, a tool is provided which comprises: i) a tool body configured for receiving the tubular structure in an enclosure thereof; ii) an actuator mounted on the tool body at one side of the enclosure; iii) a non-rotatable cutting element provided on the actuator, the actuator with the cutting element being configured for carrying out a translational cutting movement through the enclosure including the tubular structure, and iv) a reaction member mounted at an opposite side of the enclosure of the tool body opposite to the cutting element for applying a reaction force on the tubular structure during cutting. The cutting tool that is used in this embodiment of the method is the fingerprint of the cutting tool from WO2017/099607A1, wherein only the most relevant features are implemented to ensure translational cutting of the tubular structure.

In an embodiment of the method in accordance with the invention, in the step of providing the cutting tool, a tool is provided, wherein the reaction member forms part of a further actuator, which further actuator is configured for opening and closing said enclosure for receiving said subsea tubular structure. The cutting tool that is used in this embodiment of the method is a bit more sophisticated. The reaction member that forms part of a further actuator facilitates that the cutting can be carried out quicker, thus saving cutting time.

In an embodiment of the method in accordance with the invention, in the step of providing the cutting tool, a tool is provided, wherein the reaction member is provided on or inter grated with a piston rod or thread bar of the further actuator. The cutting tool that is used in this embodiment of the method is even more sophisticated than the previously-discussed embodiment. Faster cutting is obtained with this embodiment.

In an embodiment of the method in accordance with the invention, in the step of providing the cutting tool, a tool is provided, wherein the reaction member is provided with a further cutting element directed towards the non-rotatable cutting element for facilitating the cutting. Providing a cutting tool with a further cutting element on the reaction member further speeds up the cutting speed.

In a second aspect the invention relates to a cutting tool for use in the method in accordance with the invention, the cutting tool comprising: i) a tool body configured for receiving the tubular structure in an enclosure thereof; ii) an actuator mounted on the tool body at one side of the enclosure; iii) a non-rotatable cutting element provided on the actuator, the actuator with the cutting element being configured for carrying out a translational cutting movement through the enclosure including the tubular structure, and iv) a reaction member mounted at an opposite side of the enclosure of the tool body opposite to the cutting element for applying a reaction force on the tubular structure during cutting, wherein the actuator comprises a hydraulic main cylinder comprising a piston that is coupled to the non-rotatable cutting element via a piston rod, and wherein the actuator comprises an accumulator that is placed in fluid communication with the hydraulic main cylinder for storing and releasing energy, as needed, during the translational cutting movement of the non-rotatable cutting element. The cutting tool of this embodiment of the invention provides for a very efficient, fast and robust cutting of the tubular structure as the energy is applied in much smoother way than without the accumulator.

In an embodiment of the cutting tool in accordance with the invention the accumulator is placed inside the piston rod and communicates with the hydraulic main cylinder via a channel. When the actuator is designed very large, in order to be able to cut thick tubular structures, there is a lot of space available within the volume of the piston rod. This volume can be advantageously exploited for housing the accumulator without compromising the strength of the piston rod.

In a first variant the accumulator is used to control the force during cutting. If the forces are not properly controlled, there may be a risk that the system collapses. In order to achieve such controlled cutting, the accumulator is to be coupled to the low-pressure side of the piston in the hydraulic main cylinder, such that the actuator works against the accumulator pressure during cutting, i.e. the accumulator dampens the cutting movement and avoids high forces to be released when the object gives in during cutting.

In a second variant the accumulator is used to increase the force during cutting. In order to achieve such increased cutting force, the accumulator is to be coupled to the high-pressure side of the piston in the hydraulic main cylinder, such that the pressure in the accumulator adds to the hydraulic pressure applied to the high-pressure side of the piston. This variant will generate more force and also lets the cutting tool activate faster.

In an embodiment the reaction member forms part of a further actuator, which further actuator is configured for opening and closing said enclosure for receiving said tubular structure. This embodiment of the cutting tool is a bit more sophisticated. The reaction member that forms part of a further actuator facilitates that the cutting can be carried out quicker, thus saving cutting time.

In an embodiment the reaction member is provided on or integrated with a piston rod or thread bar of the further actuator. This embodiment of the cutting tool is even more sophisticated than the previously-discussed embodiment. Faster cutting is obtained with this embodiment.

In an embodiment the reaction member is provided with a further cutting element directed towards the non-rotatable cutting element for facilitating the cutting. A cutting tool with a further cutting element on the reaction member further speeds up the cutting speed.

BRIEF INTRODUCTION OF THE DRAWINGS

In the following is described an example of a preferred embodiment illustrated in the accompanying drawings, wherein.

DETAILED DESCRIPTION OF THE EMBODIMENTS

Various illustrative embodiments of the present subject matter are described below. In the interest of clarity, not all features of an actual implementation are described in this specifies cation. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various systems, structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

The figures and description show a cutting tool to be used at the drill floor, which offers an alternative solution to the existing solutions of cutting subsea. An important part of the invention resides in the carrying out of a pure translational cutting movement for severing a tubular structure at the drill floor, such as a casing, a drill string, a production tubing and a riser. Prior art methods disclose time-consuming methods such a diamond wire cutting. A translational cutting movement may be carried out with a huge variety of different tools. In the figures and detailed description only one example is given. It must be stressed that the invention is not limited to this example.

Figure 1:
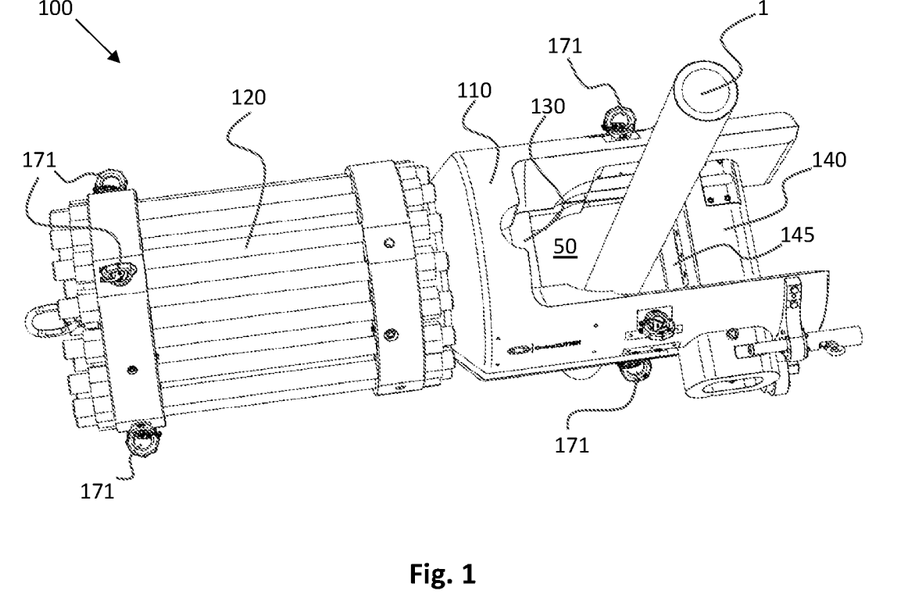
FIG. 1 shows a perspective view of an embodiment of a cutting tool in accordance with the invention, when provided around a tubular structure.

FIG. 1 shows a perspective view of an embodiment of a cutting tool in accordance with the invention, when provided around a tubular structure. The cutting tool 100 may be installed on the drill floor as a mount onto the roughneck (not shown) or as a stand-alone system (not shown), which may be run back and forth (for instance using a rail system) over the Rotary Kelly Bushing (RKB) for each cut. Alternatively, it may be manipulated by means of a crane or manipulator (not shown). FIG. 1 shows that a tubular structure 1 is received in an enclosure 50 of the cutting tool 100. The enclosure 50 is defined by a tool body 110 and a reaction member 140. The cutting tool comprises a linear actuator 120 that is coupled to a non-rotatable cutting element 130 and configured for carrying out translational cutting movement with said cutting element 130. The reaction member 140 comprises a further cutting element 145 facing the enclosure, as illustrated. The reaction member 140 forms the thread bar of a thread bar actuator, which will be discussed in more detail later. The cutting tool 100 is further provided with a plurality of hoisting connection points 171, which facilitate handling by means of a crane or other type of manipulator (not shown).

Figure 2:
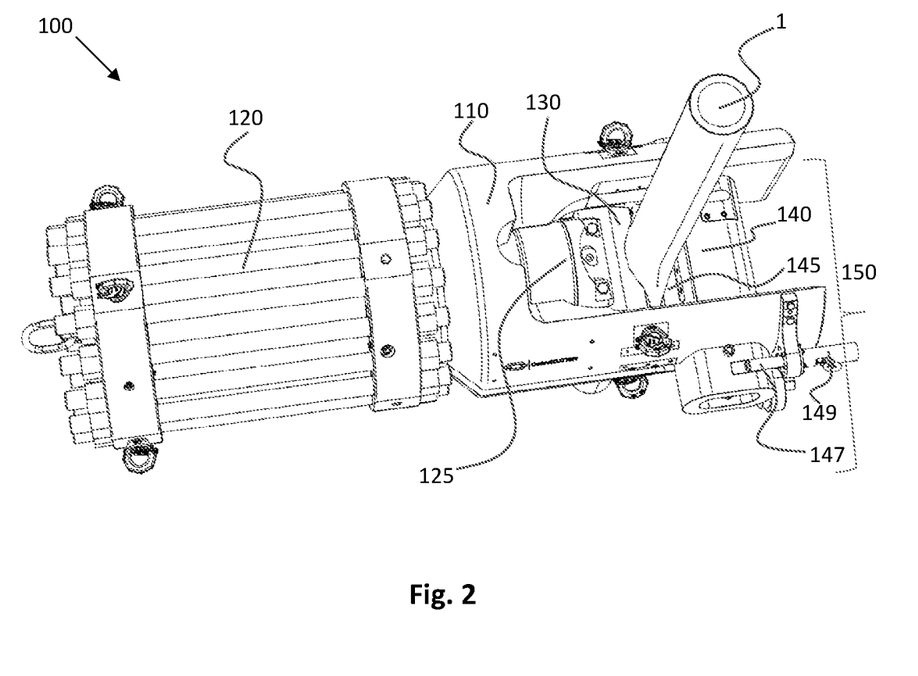
FIG. 2 shows the same perspective view as FIG. 1, wherein the cutting element is extended for cutting the tubular structure.

FIG. 2 shows the same perspective view as FIG. 1, wherein the cutting element 130 is extended for cutting the tubular structure 1. In this figure it is shown that when the linear actuator 120 is actuated a piston rod 125 onto which the cutting element 130 is mounted will come out and squeeze and cut the tubular 1 against the cutting element 145 on the reaction member 140 as illustrated. FIG. 2 further illustrates that the reaction member 140 is part of a further actuator 150 (a thread bar actuator), which also comprises an axle with a toothed wheel 147 that is driven by a motor 149. When the motor 149 is driven the toothed wheel 147 rotates runs along the reaction member 140 for pulling it in or out de-pending on the rotation direction.

The embodiment of the cutting tool of FIGS. 1 and 2 can cut tubular structures up to 30-inch (762 mm), and is able to cut drill pipes through the tool joints as well as cemented and lined casings without any problems. Further details with respect to the cutting tool of FIGS. 1 and 2 are:
pressure used in the hydraulic cylinder is 210 bar;
stoke volume of the hydraulic cylinder is 160 litre;
weight of the cutting tool is 3500 kg;
length of cutting tool is 2300 mm;
width of cutting tool is 900 mm, and
available force is 1000 ton.

It must be stressed that within the scope of the current claims also other designs and dimensions of the cutting tool are possible, such that the cutting tool is designed for other dimensions of tubular structures.

Figure 3:
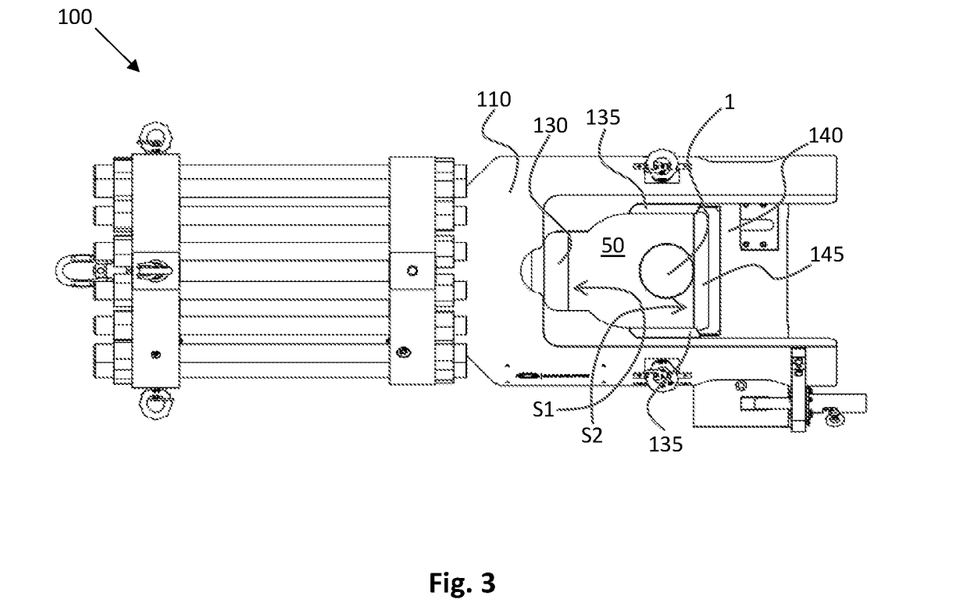
FIG. 3 shows a top-view of FIG. 1.

FIG. 3 shows a top-view of FIG. 1. In this figure it is illustrated what is meant with the first side S1 and the second, opposite, side S2 of the enclosure 50. At the first side S1 there is provided the cutting element 130 and at the second side S2 there is provided the reaction member 140 with the further cutting element 145.

Figure 4:
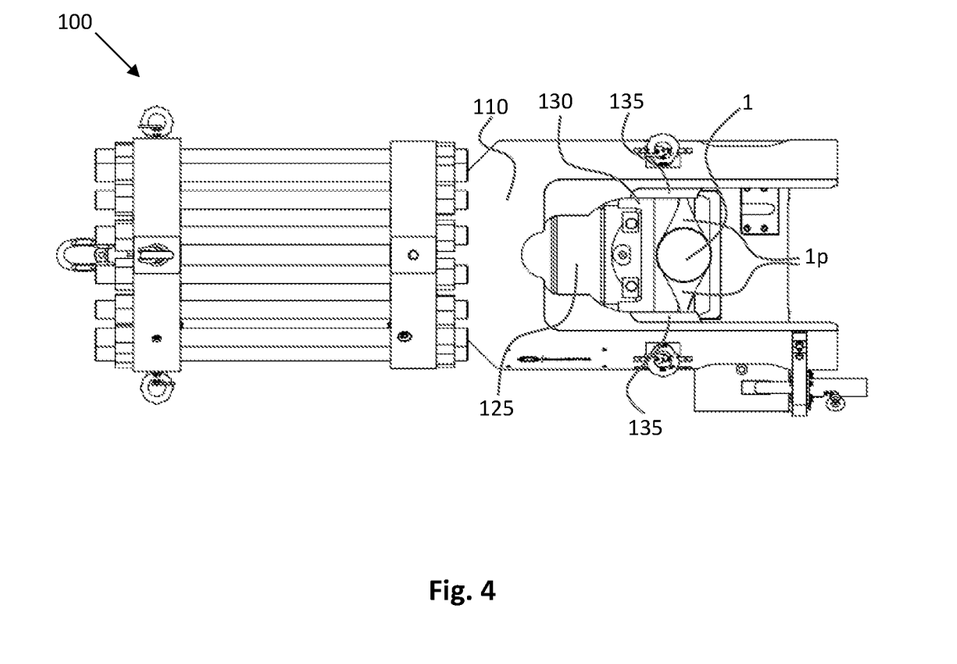
FIG. 4 shows a top-view of FIG. 2.

FIG. 4 shows a top-view of FIG. 2. This figure illustrates what happens during the cutting of the tubular structure 1. The tubular structure 1 is squeezed such that outward projections 1p are formed on the tubular structure 1. The figure also illustrates two guides 135 for guiding the cutting element 130 during the cutting movement, one on each side of the enclosure 50.

FIGS. 5-10 show different stages of an embodiment of a method of cutting a tubular structure in accordance with the invention.

Figure 5:
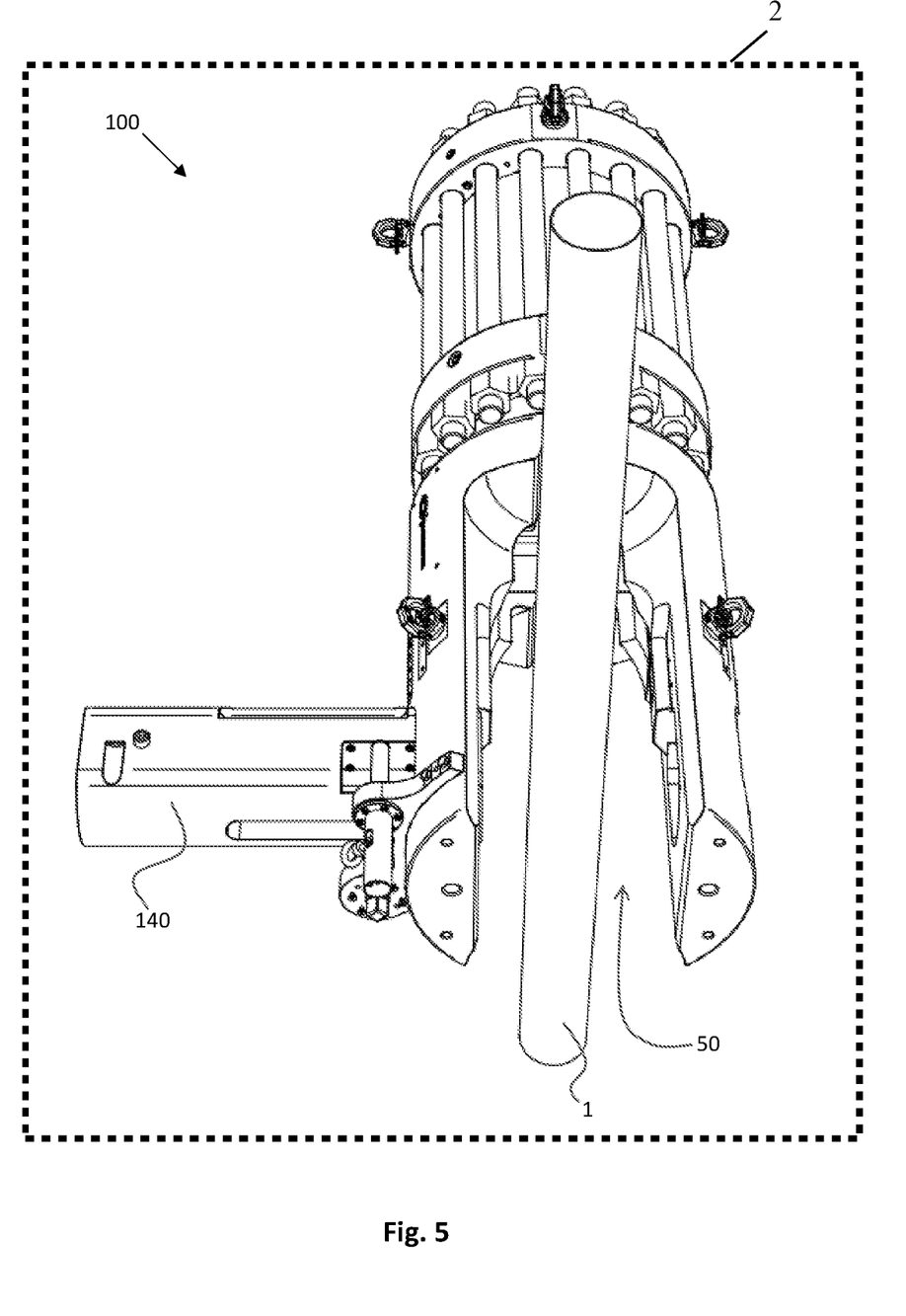
FIGS. 5-10 show different stages of an embodiment of a method of cutting a tubular structure in accordance with the invention.
Figure 6:
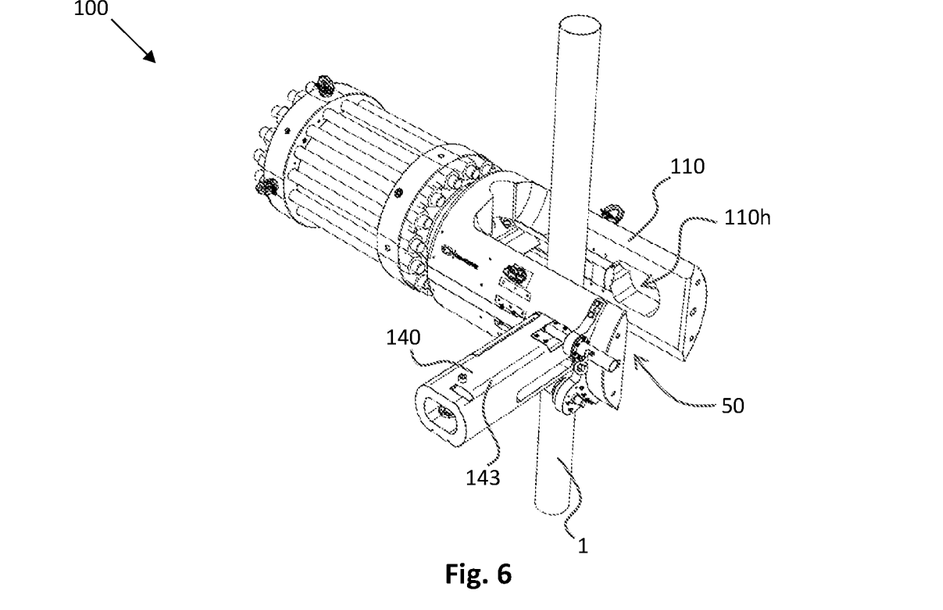

In the stage of FIG. 5 the reaction member 140 is fully extended such that the enclosure 50 is open to receive the tubular structure 1 as illustrated. FIG. 6 shows the same stage but from a different view angle. In this figure it is visible that the tool body 110 has a hole 110h for receiving the reaction member 140 when it is closed, i.e. moved into the hole 110h. The reaction member 140 comprises a toothed rack 143 at a surface thereof.

Figure 7:
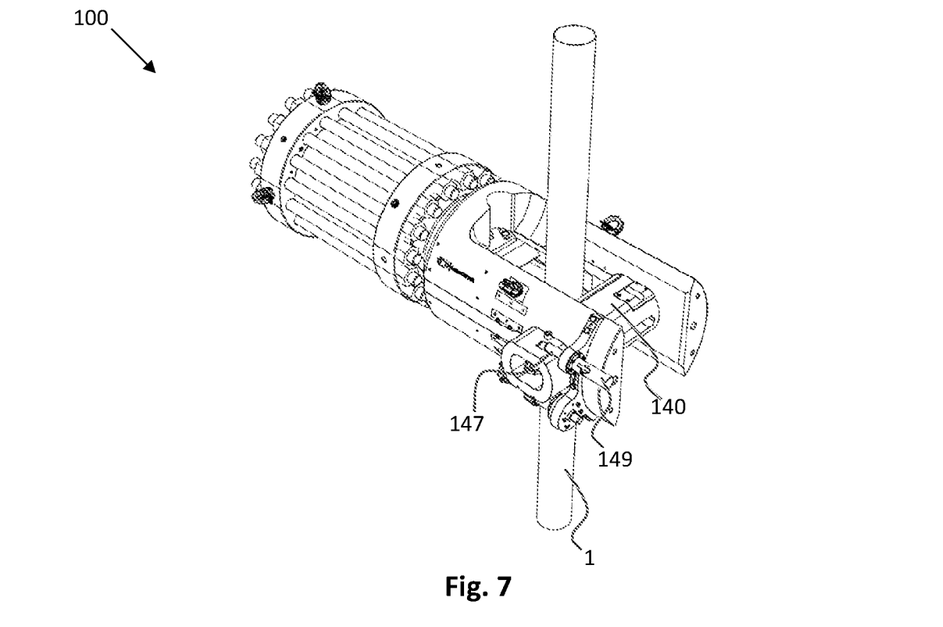

In the stage of FIG. 7 the motor 149 has drawn in the reaction member 140 by rotating the axle with toothed wheel 147 along the toothed rack 143 (FIG. 6), thereby closing the enclosure 50.

Figure 8:
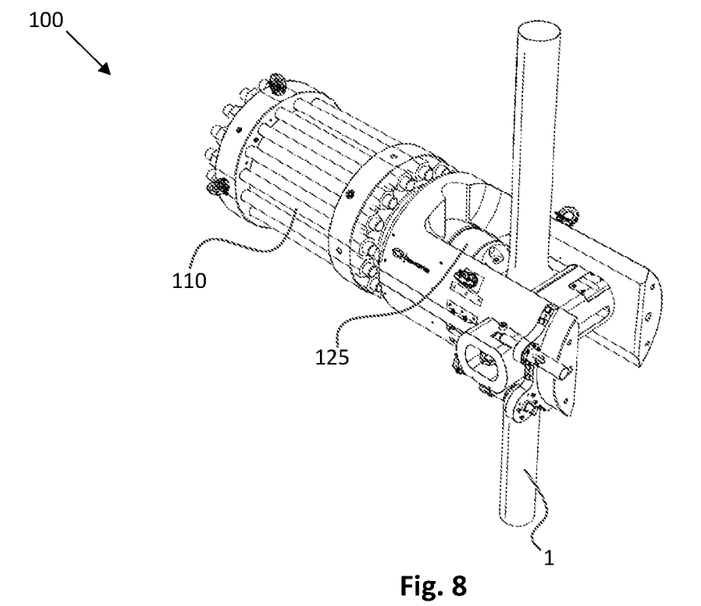

In the stage of FIG. 8 the cutting of the tubular structure 1 is carried out by the linear actuator 120 carrying out a translational cutting movement. The figure also shows the piston rod 125 that came out of the linear actuator 110.

Figure 9:
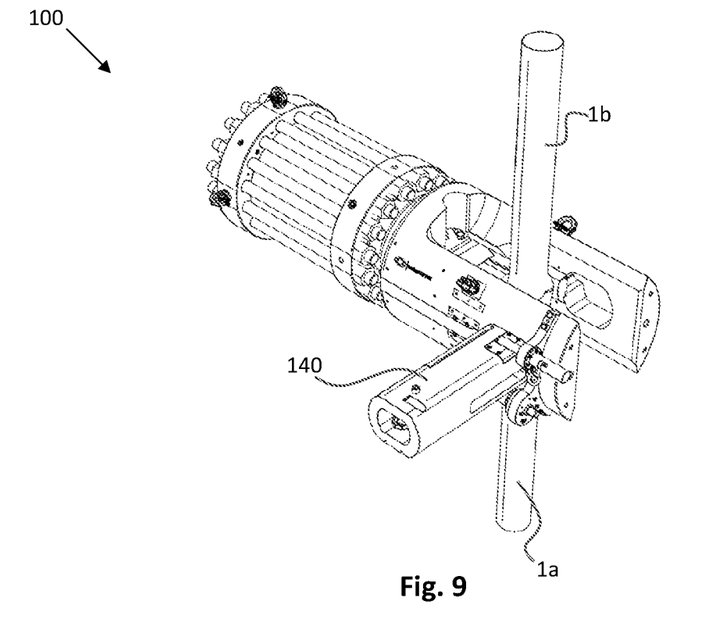
Figure 10:
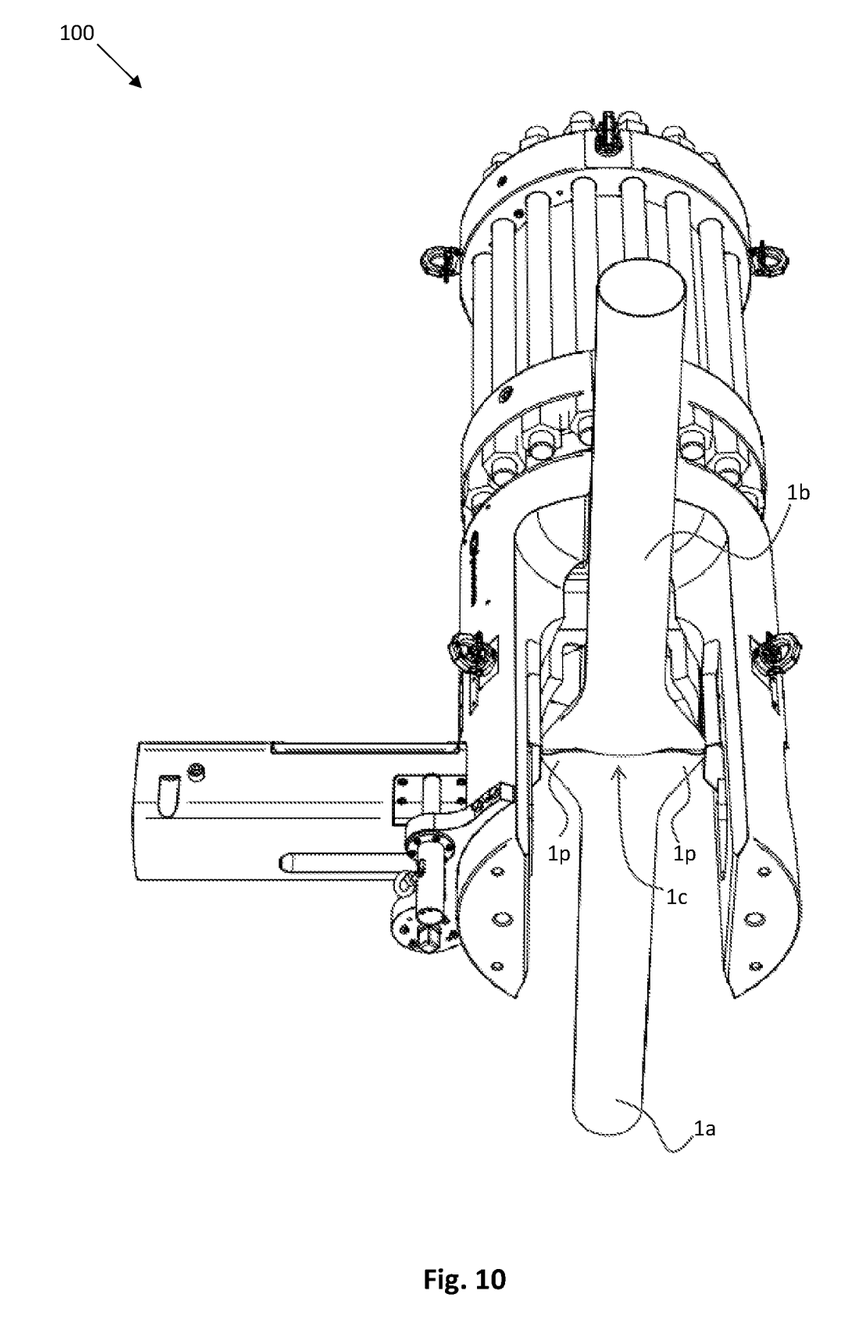

In the stage of FIG. 9 the cutting of the tubular structure 1 is finished and the reaction member 140 has been drawn out again to open the enclosure 50. It can be seen that the tubular structure 1 now comprises of two parts, i.e. a first part 1a and a second part 1b. FIG. 10 shows the same stage as FIG. 9, but from a different view angle. In this figure the respective parts 1a, 1b are clearly visible as well as the cutline 1c that separates said parts 1a, 1b. The figure also illustrates the earlier discussed outward projections 1p. These outward projections have a very clear advantage over the known abrasive techniques. When a lined, cemented casing is cut using abrasive techniques and the respective segment is removed it first needs to be pinned such that the inner part of the casing does not fall out when the segment is being lifted. Due to the collapsing of the casing when the cutting tool of the invention is used, such pinning is no longer required, which saves another significant amount of time, between 30 and 60 minutes!

Figure 11:
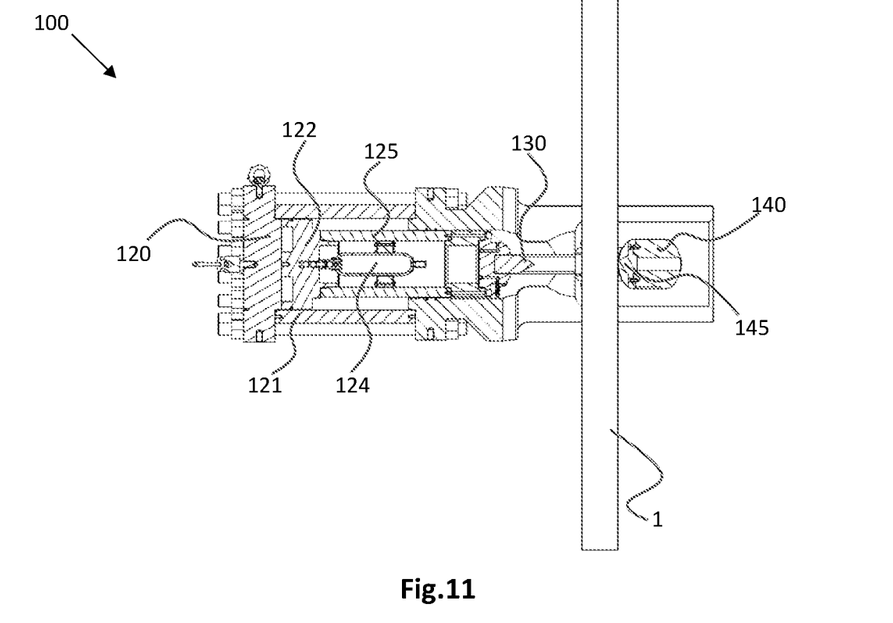
FIG. 11 shows a side view of a further embodiment of the cutting tool in accordance with the invention, wherein the cutting element is retracted.
Figure 12:
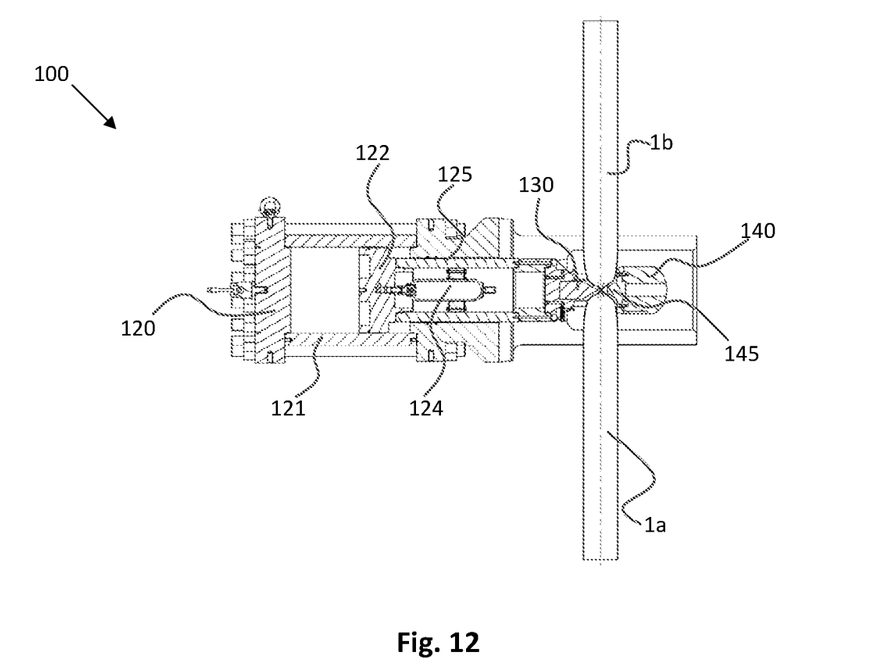
FIG. 12 shows the same side view as FIG. 11, wherein the cutting element is extended for cutting the tubular structure.

FIG. 11 shows a side view of a further embodiment of the cutting tool in accordance with the invention, wherein the cutting element is retracted. This stage corresponds to FIG. 1. FIG. 12 shows the same side view as FIG. 11, wherein the cutting element is extended for cutting the tubular structure. This stage corresponds to FIG. 2. This embodiment of the cutting tool 100 comprises an improvement in the linear actuator 120, which comprises a main hydraulic cylinder 121 in which a piston 122 reciprocates and wherein the piston rod 125 is connected to the piston 122, as illustrated. The linear actuator 120 comprises an accumulator 124 for enhancing the cutting of the tubular structure 1. The accumulator 124 is conveniently provided inside the piston rod 125, which due to its requirements has quite a large volume anyway. In this embodiment the accumulator 124 is in fluid communication with the high-pressure side of the piston 122 in the main hydraulic cylinder 121 for in-creasing the cutting force. It must be stressed that different configuration are also possible, yet the current configuration of FIGS. 11 and 12 is a very convenient, area efficient, cost-effective solution. This cutting tool of FIGS. 11 and 12 provides for a very efficient, fast and robust cutting of the tubular structure as the energy is applied in much smoother way than without the accumulator. It is submitted that the operation of an hydraulic cylinder is known as such and this is not further elaborated upon.

The particular embodiments disclosed above are illustrative only, as the invention may be modified and practiced in different but equivalent manners apparent to those skilled in the art having the benefit of the teachings herein. For example, the method steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage. In the device claims enumerating several means, several of these means may be embodied by one and the same item of hardware.

The invention claimed is:

1. A method for cutting a rigid tubular structure at a drill floor of a drilling rig, the method comprising:
   providing a cutting tool at the drill floor comprising a non-rotatable cutting element configured for carrying out a translational cutting movement through the rigid tubular structure, wherein the cutting tool comprises:
   a tool body having an enclosure configured for positioning the rigid tubular structure therein;
   an actuator mounted on the tool body at one side of the enclosure;
   a non-rotatable cutting element coupled to and moveable by the actuator for carrying out the translational cutting movement through the rigid tubular structure; and
   a reaction member mounted at an opposite side of the enclosure of the tool body opposite to the non-rotatable cutting element, wherein the reaction member closes the enclosure via a linear translational movement thereof in a first direction, wherein the reaction member is configured for opposing the translational cutting movement of the non-rotatable cutting element through the rigid tubular structure during cutting, and wherein the reaction member has a cross-section within the enclosure when the enclosure is closed that is elongated in a second direction, the cross-section being elongated to oppose the translational cutting movement through the rigid tubular structure, the second direction being coplanar but different than the first direction for closing the enclosure;
   positioning the cutting tool in a cutting position exterior to the rigid tubular structure;
   fixing the position of the cutting tool with respect to the rigid tubular structure;
   closing the enclosure of the cutting tool while the rigid tubular structure is positioned therein; and
   activating the cutting tool for cutting the rigid tubular structure via the translational cutting movement of the non-rotatable cutting element through the rigid tubular structure.

2. The method according to claim 1, wherein the rigid tubular structure to be cut is selected from a group consisting of: a casing, a drill string, a production tubing, and a riser.

3. The method according to claim 1, wherein the reaction member forms part of a further actuator configured for opening and closing the enclosure for receiving the rigid tubular structure.

4. The method according to claim 3, wherein the reaction member is provided on or integrated with a piston rod or thread bar of the further actuator.

5. The method according to claim 1, wherein the reaction member is provided with a further cutting element directed towards the non-rotatable cutting element for facilitating the cutting.

6. A cutting tool for cutting a rigid tubular structure at a drill floor of a drilling rig, wherein the cutting tool comprises:
   a tool body having an enclosure configured for positioning the rigid tubular structure in the tool body;
   an actuator mounted on the tool body at one side of the enclosure;
   a non-rotatable cutting element coupled to and moveable by the actuator for carrying out a translational cutting movement through the rigid tubular structure in a first direction; and
   a reaction member that closes the enclosure of the tool body opposite to the non-rotatable cutting element such that the reaction member opposes the translational cutting movement of the non-rotatable cutting element through the rigid tubular structure during cutting, wherein the reaction member has a cross-section within the enclosure when the enclosure is closed that is elongated in the first direction, the cross-section being elongated to oppose the translational cutting movement through the rigid tubular structure;

wherein the actuator comprises a hydraulic main cylinder comprising a piston that is coupled to the non-rotatable cutting element via a piston rod, and wherein the actuator comprises an accumulator that is placed in fluid communication with the hydraulic main cylinder for storing and releasing energy, as needed, during the translational cutting movement of the non-rotatable cutting element.

7. The cutting tool according to claim 6, wherein the accumulator is placed inside the piston rod and communicates with the hydraulic main cylinder via a channel.

8. The cutting tool according to claim 7, wherein the accumulator communicates with a low-pressure side of the piston in the hydraulic main cylinder.

9. The cutting tool according to claim 7, wherein the accumulator communicates with a high-pressure side of the piston in the hydraulic main cylinder.

10. The cutting tool according to claim 6, wherein the reaction member forms part of a further actuator, wherein the further actuator is configured for opening and closing the enclosure for receiving the rigid tubular structure.

11. The cutting tool according to claim 10, wherein the reaction member is provided on or integrated with a piston rod or thread bar of the further actuator.

12. The cutting tool according to claim 6, wherein the reaction member is provided with a further cutting element directed towards the non-rotatable cutting element for facilitating the cutting.

13. The method according to claim 1, wherein the non-rotatable cutting element and the reaction member are positioned to cut the rigid tubular structure without overlapping each other.

14. A method for cutting a rigid tubular structure at a drill floor of a drilling rig, the method comprising:
providing a cutting tool at the drill floor comprising a reaction member and a non-rotatable cutting element configured for carrying out a translational cutting movement in a first direction towards the reaction member and through the rigid tubular structure, wherein the cutting tool comprises:
a tool body having an enclosure configured for positioning the rigid tubular structure therein;
an actuator mounted on the tool body at one side of the enclosure;
a non-rotatable cutting element coupled to and moveable by the actuator for carrying out the translational cutting movement through the rigid tubular structure; and
a reaction member mounted at an opposite side of the enclosure of the tool body opposite to the non-rotatable cutting element, wherein the reaction member closes the enclosure via a linear translational movement thereof in a first direction, wherein the reaction member is configured for opposing the translational cutting movement of the non-rotatable cutting element through the rigid tubular structure during cutting, and wherein the reaction member has a cross-section within the enclosure when the enclosure is closed that is elongated in a second direction, the cross-section being elongated to oppose the translational cutting movement through the rigid tubular structure, the second direction being coplanar but different than the first direction for closing the enclosure;
positioning the cutting tool in a cutting position exterior to the rigid tubular structure;
fixing the position of the cutting tool with respect to the rigid tubular structure;
moving the reaction member in the second direction relative to the non-rotatable cutting element; and
activating the cutting tool for cutting the rigid tubular structure by using the translational cutting movement of the cutting element through the rigid tubular structure such that the rigid tubular structure is cut without the cutting element overlapping the reaction member.

15. The method according to claim 14, wherein the reaction member is provided with a further cutting element directed towards the non-rotatable cutting element for facilitating the cutting.

16. The method according to claim 14, wherein the actuator comprises a hydraulic main cylinder comprising a piston that is coupled to the non-rotatable cutting element via a piston rod, and wherein the actuator comprises an accumulator that is placed in fluid communication with the hydraulic main cylinder, further comprising storing and releasing energy via the accumulator, as needed, during the translational cutting movement of the non-rotatable cutting element.

17. The method according to claim 16, wherein the reaction member forms part of a further actuator, wherein the enclosure is closed via operating the further actuator.

18. A cutting tool according to claim 6, wherein the translational cutting movement of the non-rotatable cutting element is configured to cut the rigid tubular structure without overlapping the reaction member.

19. The method according to claim 1, wherein the cutting tool further comprises a motor operable to rotate a toothed wheel, and a toothed rack that is coupled to the reaction member, wherein the enclosure is closed by operating the motor to rotate the toothed wheel on the toothed rack.

20. The cutting tool according to claim 6, further comprising a motor operable to rotate a toothed wheel, and a toothed rack that is coupled to the reaction member, wherein the enclosure is configured to be closed by operating the motor to rotate the toothed wheel on the toothed rack.

* * * * *